United States Patent
Campbell et al.

(10) Patent No.: US 9,639,700 B2
(45) Date of Patent: May 2, 2017

(54) UNIFIED EXTENSIBLE FIRMWARE INTERFACE (UEFI) DATABASE FOR SECURE BOOTSTRAP OF A COMPUTER

(71) Applicant: LENOVO ENTERPRISE SOLUTIONS (SINGAPORE) PTE. LTD. CORPORATION, New Tech Park (SG)

(72) Inventors: Nathan K. Campbell, Edmonds, WA (US); Doug W. Oliver, Round Rock, TX (US); Wen Wei Tang, Shanghai (CN)

(73) Assignee: LENOVO ENTERPRISE SOLUTIONS (SINGAPORE) PTE. LTD., New Tech Park (SG)

(*) Notice: Subject to any disclaimer, the term of this patent is extended or adjusted under 35 U.S.C. 154(b) by 33 days.

(21) Appl. No.: 14/663,452

(22) Filed: Mar. 20, 2015

(65) Prior Publication Data

US 2016/0275291 A1    Sep. 22, 2016

(51) Int. Cl.
*G06F 9/24*    (2006.01)
*G06F 15/177*    (2006.01)
*G06F 21/57*    (2013.01)
*G06F 17/30*    (2006.01)
*G06F 11/36*    (2006.01)
*G06F 21/55*    (2013.01)

(52) U.S. Cl.
CPC ........ *G06F 21/575* (2013.01); *G06F 17/3056* (2013.01); *G06F 11/366* (2013.01); *G06F 17/30575* (2013.01); *G06F 21/552* (2013.01); *G06F 2221/033* (2013.01)

(58) Field of Classification Search
CPC ................. G06F 21/552; G06F 11/366; G06F 17/30575; G06F 17/3056
USPC ................................................. 713/1, 2, 100
See application file for complete search history.

(56) References Cited

U.S. PATENT DOCUMENTS

| | | | |
|---|---|---|---|
| 8,677,108 B2 | 3/2014 | Nicolson et al. | |
| 2012/0158653 A1* | 6/2012 | Shaffer | G06F 17/30575 707/622 |
| 2014/0149730 A1 | 5/2014 | Joshi et al. | |
| 2015/0089209 A1* | 3/2015 | Jacobs | G06F 21/575 713/1 |

FOREIGN PATENT DOCUMENTS

| | | |
|---|---|---|
| EP | 1934882 | 6/2008 |
| WO | WO2005019974 | 3/2005 |

* cited by examiner

*Primary Examiner* — Michael J Brown
(74) *Attorney, Agent, or Firm* — Steven M. Greenberg, Esq.; CRGO Law

(57) ABSTRACT

Embodiments of the present invention provide a method, system and computer program product for UEFI firmware database management of keys and certificates during a UEFI secure bootstrap enabled boot of a computer. In an embodiment of the invention, a method for UEFI firmware database management for secure bootstrap of a computer includes initially receiving a request to modify a database in UEFI firmware of an operating computer. Thereafter, an impact of the request is determined in memory of the operating computer in terms of the operability of an accessory driver. As such, a prompt warning of the determined impact is generated in the memory and displayed in a display of the operating computer.

18 Claims, 2 Drawing Sheets

UNIFIED EXTENSIBLE FIRMWARE INTERFACE (UEFI) DATABASE FOR SECURE BOOTSTRAP OF A COMPUTER

BACKGROUND OF THE INVENTION

Field of the Invention

The present invention relates to the use of UEFI firmware management and more particularly to database management in a UEFI secure boot driver.

Description of the Related Art

The Unified Extensible Firmware Interface (UEFI) is a computing specification that defines a software interface between an operating system and platform firmware. UEFI replaces the venerable Basic Input/Output System (BIOS) firmware interface, originally present in all "IBM-compatible" personal computers. Unlike the legacy BIOS technology, in UEFI a boot sector is not required. Rather, UEFI defines the boot manager as part of the UEFI compliant firmware. As such, when a computer initially powers on, the boot manager checks the boot configuration, and according to the boot configuration, the boot manager loads and executes the specified operating system loader, or in the alternative, a specified operating system kernel.

The UEFI specification adds a protocol known as "UEFI secure boot". UEFI secure boot secures the boot process by preventing the loading of drivers or operating system loaders that are not signed with an acceptable digital signature. When UEFI secure boot is enabled, secure boot initially is placed in "setup" mode, which allows a public key known as the platform key (PK) to be written to the firmware. Once the key is written, secure boot enters a user mode, in which only drivers and loaders signed with the platform key can be loaded by the firmware. Additional "key exchange keys" (KEK) may be added to a database stored in memory to allow other certificates to be used, but all KEKs must still have a connection to the private portion of the PK. UEFI Secure boot can also be placed in a custom mode, in which additional public keys can be added to the system that do not match the private key. Specifically, in custom Mode a default set of keys and databases are presented as in an ordinary user mode, but in custom mode, the end user is permitted to add or remove any of the keys and databases. In any case, as can be seen, secure boot prevents unauthorized operating systems and software from loading during the startup process.

Of note each manufacturer of an auxiliary component of a computer provide in advance to the computer manufacturer the requisite driver or drivers necessary for the auxiliary component to perform in connection with the computer in which the auxiliary component is to be installed. In this way, the computer manufacturer can include a signed form of the driver in the UEFI firmware. However, oftentimes, new auxiliary components are produced after the deployment of a computer. Thus, the UEFI firmware must permit the ad hoc addition of new signed drivers to the UEFI firmware. As well, to the extent that older drivers no longer remain valid or are replaced with new versions of the same driver, the UEFI firmware must permit the ad hoc removal of the older signed drivers from the UEFI firmware.

To support the ad hoc addition and removal of signed drivers to the UEFI firmware, the UEFI firmware enjoys access to each of a signature database, a revoked signature database, and a KEK database. These databases are stored on the flash at manufacturing time. The signature database and the revoked signatures database list the signers or image hashes of UEFI applications, operating system loaders, and UEFI drivers that can be loaded on the server, and the revoked images for items that are no longer trusted and may not be loaded. The KEK database is a separate database of signing keys that can be used to update the signature database and revoked signatures database.

Once the signature and revoked signatures database and KEK database have been added to the UEFI firmware, subsequent to final firmware validation and testing, the computer manufacturer locks the firmware from editing, excepting for updates that are signed with the correct key or updates by a physically present user utilizing firmware menus, and generating a resulting PK. The PK thereafter can be used to sign updates to the KEK or to disable secure boot. In general, there is a precedence order from most significant to least significant of PK, KEK, signatures database and revoked signatures database. The rules of precedence first require that in order to update a KEK a signature with the correct PK must be provided. Also, in order to update a signatures database or a revoked signatures database, a signature with the correct PK or KEK must be provided.

Of note, if a signing certificate is enrolled in a signatures database, then all images signed by that certificate are run, unless that certificate or individual signatures are found in the revoked signatures database. Even yet further, if a certificate of an image is not found in the signatures database, but a signature for the certificate is found, then the image is run, unless a corresponding certificate or signature is found in the revoked signatures database. Likewise, if a certificate or signature of an image is found in the revoked signatures database, then the image is not run, even if certificate or signature is found in the signatures database. Finally, if an image is properly signed, but neither its certificate nor signature is found in signatures database, then the image is not run, and also, unsigned images are not run. Give the complexity of the rules of precedence, the ad hoc addition or removal of a key can have wide reaching consequences not readily ascertainable by the end user.

BRIEF SUMMARY OF THE INVENTION

Embodiments of the present invention address deficiencies of the art in respect to modifying the content of UEFI firmware and provide a novel and non-obvious method, system and computer program product for UEFI firmware database management for UEFI secure bootstrap of a computer. In an embodiment of the invention, a method for UEFI firmware database management for secure bootstrap of a computer includes initially receiving a request to modify a database in UEFI firmware of an operating computer. Thereafter, an impact of the request is determined in memory of the operating computer in terms of the operability of an accessory driver. As such, a prompt warning of the determined impact is generated in the memory and displayed in a display of the operating computer.

In one aspect of the embodiment, the request is a request to enroll a new database in the UEFI firmware. Alternatively, the request is a request to remove a database from the UEFI firmware. In another aspect of the embodiment, the impact is a new operability of a previously inoperable accessory driver in the operating computer, or in the alternative, a new inoperability of a previously operable driver in the operating computer. Finally, in yet another aspect of the embodiment, the request is processed without a re-boot if the impact is that a previously operable accessory driver remains operable, or that a previously inoperable accessory driver remains inoperable, but otherwise an additional prompt to re-boot the operating computer is generated and displayed in the operating computer.

In another embodiment of the invention, a computer data processing system is provided. The system includes an operating computer with memory and at least one processor and UEFI firmware managing bootstrap of the operating computer. Further, a multiplicity of databases are disposed in the UEFI firmware, selected ones of the databases storing driver data for the UEFI firmware and other ones of the databases storing signing keys for the selected ones of the databases. Finally, a UEFI database management module executes in memory of the operating computer and includes program code enabled upon execution in the memory of the operating computer to receive a request to modify one of the databases, to determine an impact of the request in terms of the operability of an accessory driver for the operating computer, and to generate and display in the operating computer a prompt warning of the determined impact.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for UEFI firmware database management for secure bootstrap of a computer. In accordance with an embodiment of the invention, a request to modify a database in the UEFI firmware of an operating computer can be received, for example a key enrollment key (KEK) database, a signature database or a revoked signature database. The request can include a request to add a new database to the UEFI firmware, or a request to remove a database from the UEFI firmware. In response to the request, an impact of the request in terms of the operability of an accessory driver can be assessed and a prompt generated and displayed warning of the assessed impact. In this regard, the assessed impact can include the new operability of a previously inoperable accessory driver, or the new inoperability of a previously operable driver. In either case, the request can be processed and an additional prompt can be generated to re-boot the computer system thereafter; however, to the extent that the assessed impact is that a previously operable accessory driver remains operable, or that a previously inoperable accessory driver remains inoperable, the request can be processed without invoking a reboot operation.

Figure 1:
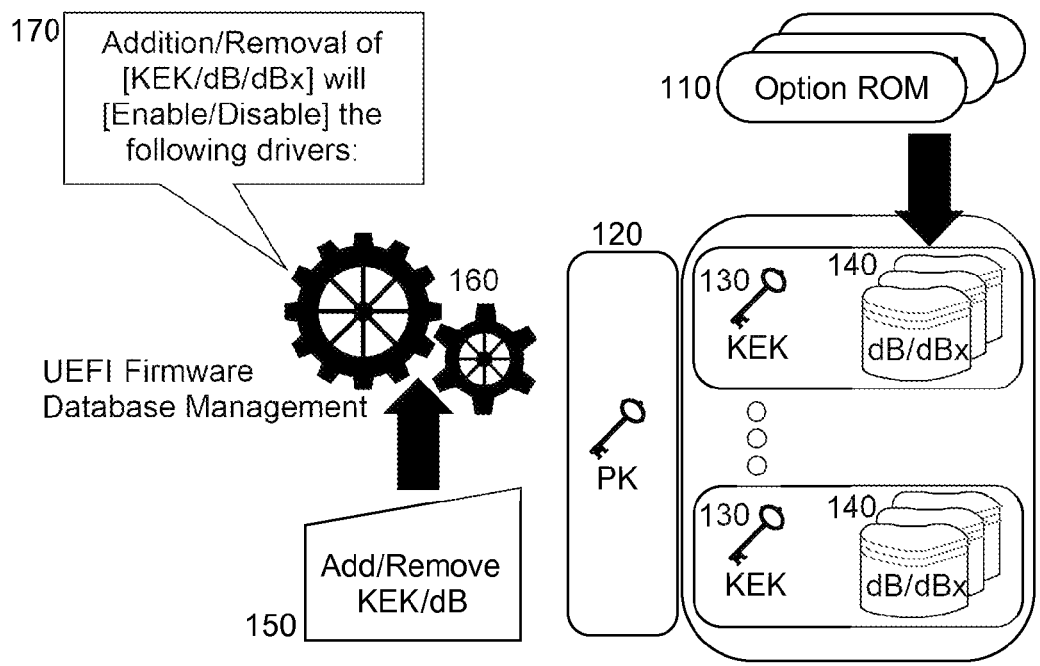
FIG. 1 is a pictorial illustration of a process for UEFI firmware database management for secure bootstrap of a computer.

In further illustration, FIG. 1 pictorially shows a process for UEFI firmware database management for secure bootstrap of a computer. As shown in FIG. 1 UEFI firmware can include one or more option read-only memories (ROMs) 110 (which also may be stored directly in the firmware of an expansion card) driven by one or more drivers signed by one or more signature databases 140 or expressly revoked by one or more revoked signature databases 140, collectively referred to herein as signature/revoked signature databases 140. One or more KEK databases 130 also can be provided corresponding to one or more of the databases 140. Yet further, a single private key (PK) 120 can be provided for each of the KEKs 130. Finally, UEFI firmware database logic 160 can be disposed within the UEFI firmware and accessing the PK 120, KEK databases 130 and signature/revoked signature databases 140.

In operation, the UEFI firmware database logic 160 can receive a request 150 to add or remove one of the signature/revoked signature databases 140. In response to receiving the request 150, the UEFI firmware database logic 160 can determine what if any impact the satisfaction of the request 150 may have on one or more of the option ROMs 110. In this regard, if the request 150 is one to add or remove one of the signature/revoked signature databases 140, the resultant operability or inoperability of a corresponding one of the option ROMs 110 can be determined.

For example, to the extent that an option ROM 110 can be rendered operable only if a corresponding signature database 140 exists for the option ROM 110, the removal of the corresponding signature database 140 will render the option ROM 110 inoperable. Conversely, to the extent that an option ROM 110 can be rendered operable so long as a corresponding revoked signature database 140 is not present for the option ROM 110, the removal of the corresponding revoked signature database 140 will render the option ROM 110 operable in so far as a corresponding signature database 140 exists for the option ROM 110.

Once the impact of the satisfaction of the request 150 is determined, it can be determined whether or not the impact will reflect a change from the contemporaneous status of an affected one of option ROMs 110. If not, the request 150 can be satisfied with the addition or removal of the signature/revoked signature database 140 as the case may be without requiring a reboot operation of an underlying computing device. However, the impact will in fact reflect a change from the contemporaneous status of an affected one of option ROMs 110, a prompt 170 can be generated and displayed indicating the impact. Thereafter, the request 150 can be satisfied with the addition or removal of the signature/revoked signature database 140 as the case may be and a reboot operation of an underlying computing device performed.

Of import, the request 150 not only can refer to the addition or removal of one or more of the signature/revoked signature databases 140, but also the request 150 can refer to one or more of the KEK databases 120. In the latter instance, the UEFI firmware database management logic 160 can respond to the request 150 first by determining one or more of the signature/revoked signature databases 140 signed by a specified one of the KEK databases 120. Thereafter, the impact of the addition or removal of the signature/revoked signature databases 140 signed by the specified one of the KEK database 120 can be determined and the prompt 170 displayed when an impact is detected requiring a reboot operation for the underlying computing device. However, to the extent that the impact does not require a reboot operation for the underlying computing device, no reboot will occur.

Figure 2:
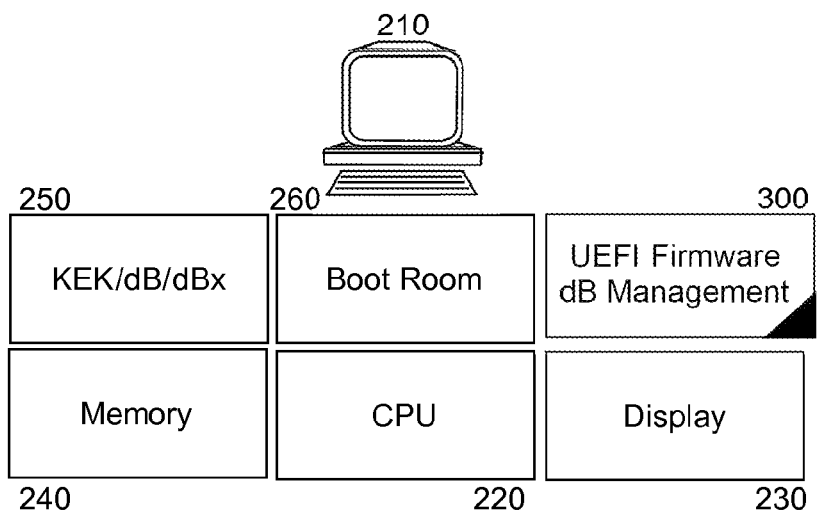
FIG. 2 is a schematic illustration of a data processing system configured for UEFI firmware database management for secure bootstrap of a computer; and, FIG. 3 is a flow chart illustrating a process for UEFI firmware database management for secure bootstrap of a computer.

The process described in connection with FIG. 1 can be implemented in a computer data processing system. In yet further illustration, FIG. 2 schematically shows a data processing system configured for UEFI firmware database management for secure bootstrap of a computer. The system includes an underlying computing device 210 with at least one processor 220, memory 240 and a display 230. The system also can include a boot room 260 disposed within the underlying computing device 210 managing the operability of one or more option ROMs (not shown) based upon the presence in a data store 250 of a signature database for operable ones of the option ROMs and the lack of a presence in the data store 250 of a revoked signature database for those same operable option ROMs and the presence of a KEK database in the data store 250 associated with one or more of the signature databases for operable ones of the option ROMs.

Notably, the system can also include a UEFI firmware database management module 300 coupled to the boot room and executing in the memory 240 of the underlying computing device. The UEFI firmware database management module 300 can include program code executing in the memory 240 so as to respond to a request to modify a database in the data store 250 by assessing an impact of the request in terms of the operability of an accessory driver and to generate and display in the display 230 a prompt warning of the assessed impact. The program code of the module further can be enabled to process the request and to direct the re-booting the underlying computing device; however, to the extent that the assessed impact is that a previously operable accessory driver remains operable, or that a previously inoperable accessory driver remains inoperable, the request can be processed without invoking a reboot operation.

Figure 3:
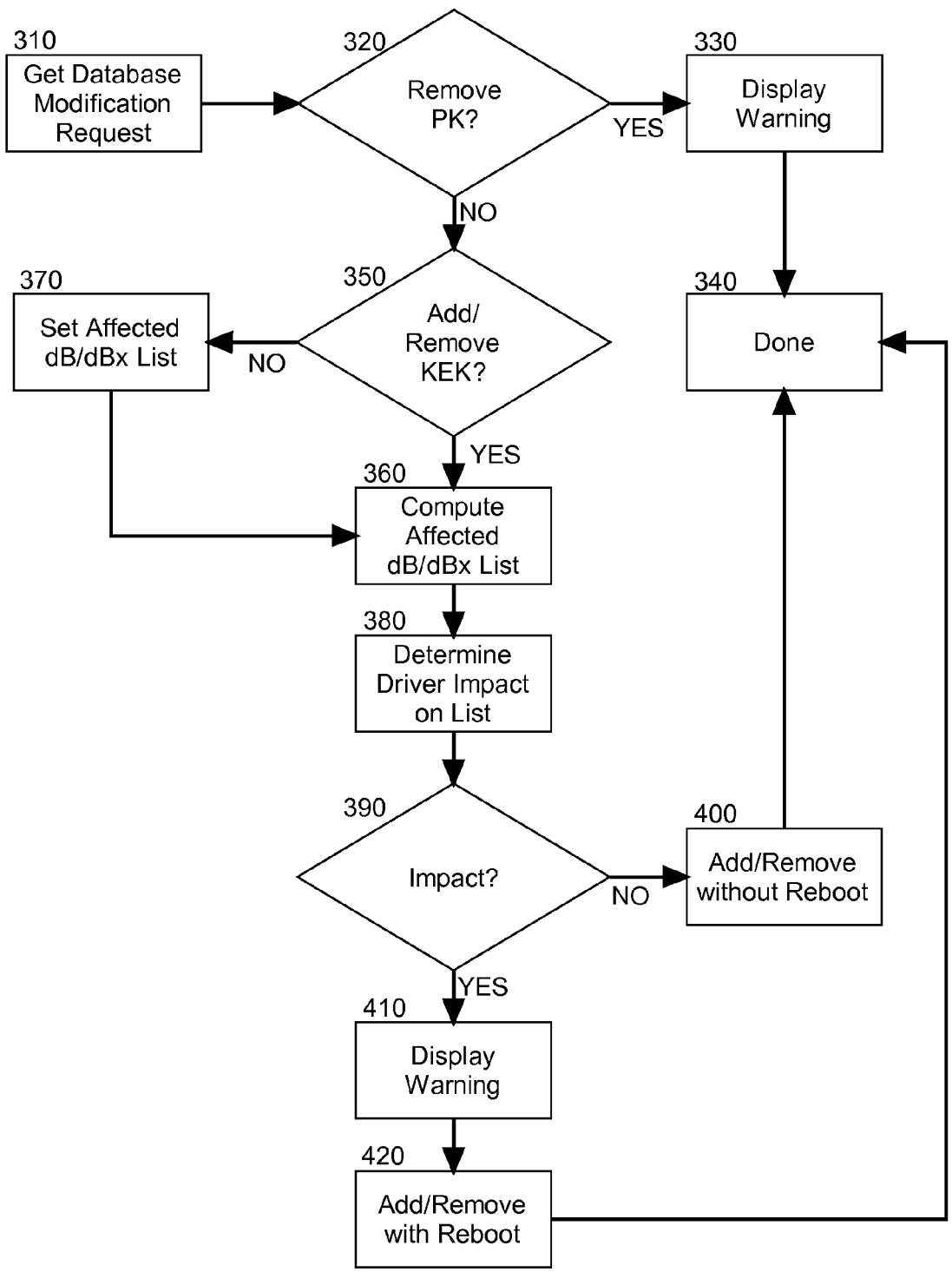

In even yet further illustration of the operation of the program code of the UEFI firmware database management module 300, FIG. 3 is a flow chart illustrating a process for UEFI firmware database management for secure bootstrap of a computer. Beginning in block 310, a database modification request can be received to either add or remove one of a signature database, a revoked signature database or a KEK database. In block 320, it first can be determined whether or not the request includes a request to remove a primary key for all KEK databases. If so, in block 330 a warning can be displayed and the request ignore. Otherwise, the process can continue through decision block 350.

In decision block 350, it can be determined if the request is one to add or remove a KEK database. If so, existing signature and revoked signature database associated with the KEK database can be determined and added to a list of databases to be operated upon. Otherwise, in block 370, the database specified in the request can be added to the list of database to be operated upon. In either case, in block 380, an impact can be computed in respect to the request and those databases in the list. In decision block 390, to the extent that the impact is determined to render inoperable an already inoperable option ROM, or to the extent that the impact is determined to render operable an already operable option ROM, in block 400 the addition or removal of the database can be performed without requiring a reboot and the process can end in block 340. However, to the extent that the impact is determined to render inoperable an operable option ROM, or to the extent that the impact is determined to render operable an inoperable option ROM, in block 410 a warning can be displayed in the underlying computing device of the determined impact and upon approval by the end user, in block 420 the addition or removal of the database can be performed along with a subsequent reboot of the underlying computing device and in block 340 the process can end.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for Unified Extensible Firmware Interface (UEFI) firmware database management for secure bootstrap of a computer, the method comprising:
   receiving a request to modify a database in UEFI firmware of an operating computer;
   determining in memory of the operating computer an impact of the request in terms of the operability of an accessory driver; and,
   generating in the memory and displaying in a display of the operating computer a prompt warning of the determined impact.

2. The method of claim 1, wherein the request comprises a request to enroll a new database in the UEFI firmware.

3. The method of claim 1, wherein the request comprises a request to remove a database from the UEFI firmware.

4. The method of claim 1, wherein the impact comprises a new operability of a previously inoperable accessory driver in the operating computer.

5. The method of claim 1, wherein the impact comprises a new inoperability of a previously operable driver in the operating computer.

6. The method of claim 1, further comprising processing the request without a re-boot if the impact is that a previously operable accessory driver remains operable, or that a previously inoperable accessory driver remains inoperable, but otherwise generating and displaying an additional prompt to re-boot the operating computer.

7. A computer data processing system comprising Unified Extensible Firmware Interface (UEFI) firmware for database management during secure bootstrap of a computer, the system comprising:
   an operating computer comprising memory and at least one processor;
   UEFI firmware managing bootstrap of the operating computer;
   a multiplicity of databases disposed in the UEFI firmware, selected ones of the databases storing driver data for the UEFI firmware and other ones of the databases storing signing keys for the selected ones of the databases; and a UEFI database management module executing in memory of the operating computer, the module comprising program code enabled upon execution in the memory of the operating computer to receive a request to modify one of the databases, to determine an impact of the request in terms of the operability of an accessory driver for the operating computer, and to generate and display in the operating computer a prompt warning of the determined impact.

8. The system of claim 7, wherein the request comprises a request to enroll a new database in the UEFI firmware.

9. The system of claim 7, wherein the request comprises a request to remove a database from the UEFI firmware.

10. The system of claim 7, wherein the impact comprises a new operability of a previously inoperable accessory driver in the operating computer.

11. The system of claim 7, wherein the impact comprises a new inoperability of a previously operable driver in the operating computer.

12. The system of claim 7, wherein the program code is further enabled to process the request without a re-boot if the impact is that a previously operable accessory driver remains operable, or that a previously inoperable accessory driver remains inoperable, but otherwise to generate and display an additional prompt to re-boot the operating computer.

13. A computer program product for Unified Extensible Firmware Interface (UEFI) firmware database management for secure bootstrap of a computer, the computer program product comprising a computer readable storage memory device having program instructions embodied therewith, the program instructions executable by a device to cause the device to perform a method comprising:

receiving a request to modify a database in UEFI firmware of an operating computer;

determining in memory of the operating computer an impact of the request in terms of the operability of an accessory driver; and, generating in the memory and displaying in a display of the operating computer a prompt warning of the determined impact.

14. The computer program product of claim 13, wherein the request comprises a request to enroll a new database in the UEFI firmware.

15. The computer program product of claim 13, wherein the request comprises a request to remove a database from the UEFI firmware.

16. The computer program product of claim 13, wherein the impact comprises a new operability of a previously inoperable accessory driver in the operating computer.

17. The computer program product of claim 13, wherein the impact comprises a new inoperability of a previously operable driver in the operating computer.

18. The computer program product of claim 13, wherein the method further comprises processing the request without a re-boot if the impact is that a previously operable accessory driver remains operable, or that a previously inoperable accessory driver remains inoperable, but otherwise generating and displaying an additional prompt to re-boot the operating computer.

* * * * *